(12) United States Patent
Zhang et al.

(10) Patent No.: US 7,012,675 B1
(45) Date of Patent: Mar. 14, 2006

(54) KNUCKLE ARM

(75) Inventors: Kuang-Wei Zhang, Dong-Guan (CN); Tai-Xiong Chen, Dong-Guan (CN)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/021,360

(22) Filed: Dec. 22, 2004

(30) Foreign Application Priority Data

Sep. 22, 2004 (TW) ............................. 93128708 A (51) Int. Cl.
*G03B 27/62* (2006.01)
*G03B 27/64* (2006.01)

(52) U.S. Cl. ...................... 355/75; 16/327; 248/276.1; 248/284.1; 347/101; 355/76

(58) Field of Classification Search ................. 355/75, 355/76, 72; 347/101, 104, 108; 399/361, 399/363, 380; 16/289, 294; 248/284.1, 248/276.1, 286.11, 287.1
See application file for complete search history.

(56) References Cited

U.S. PATENT DOCUMENTS

| 4,588,290 | A | * | 5/1986 | Ohtsuka ........................ 355/76 |
| 5,621,501 | A | * | 4/1997 | Matsuo et al. ................. 355/75 |
| 6,100,963 | A | * | 8/2000 | Hosaka ......................... 355/75 |
| 6,327,457 | B1 | * | 12/2001 | Hashimoto ................... 399/379 |
| 6,456,365 | B1 | | 9/2002 | Hosaka et al. |
| 6,593,999 | B1 | * | 7/2003 | Hosaka ......................... 355/75 |
| 6,629,336 | B1 | * | 10/2003 | Hosaka et al. ................. 16/327 |
| 6,663,064 | B1 | * | 12/2003 | Minelli et al. ............ 248/205.5 |

* cited by examiner

*Primary Examiner*—Anita King
*Assistant Examiner*—Tan Le
(74) *Attorney, Agent, or Firm*—Christie, Parker and Hale, LLP (57) ABSTRACT

A knuckle arm interconnects a machine body and a top cover of a machine, and includes a base fixed on the machine body and having a receiving frame, an inner sliding seat slidable within the receiving frame and having a cam surface, a resilient member disposed between the receiving frame and the inner sliding seat, a first pivotable seat sleeved on the base, a pressing rod extending through the first pivotable seat and biased to contact the cam surface, and a second pivotable seat slidable on the first pivotable seat and attached to the top cover of the machine.

8 Claims, 12 Drawing Sheets

KNUCKLE ARM

CROSS-REFERENCE TO RELATED APPLICATION

This application claims priority of Taiwanese Application No. 093128708, filed on Sep. 22, 2004.

BACKGROUND OF THE INVENTION

1. Field of the Invention

This invention relates to a part of an office machine, and more particularly to a knuckle arm that interconnects a machine body and a top cover of an office machine.

2. Description of the Related Art

Figure 1:
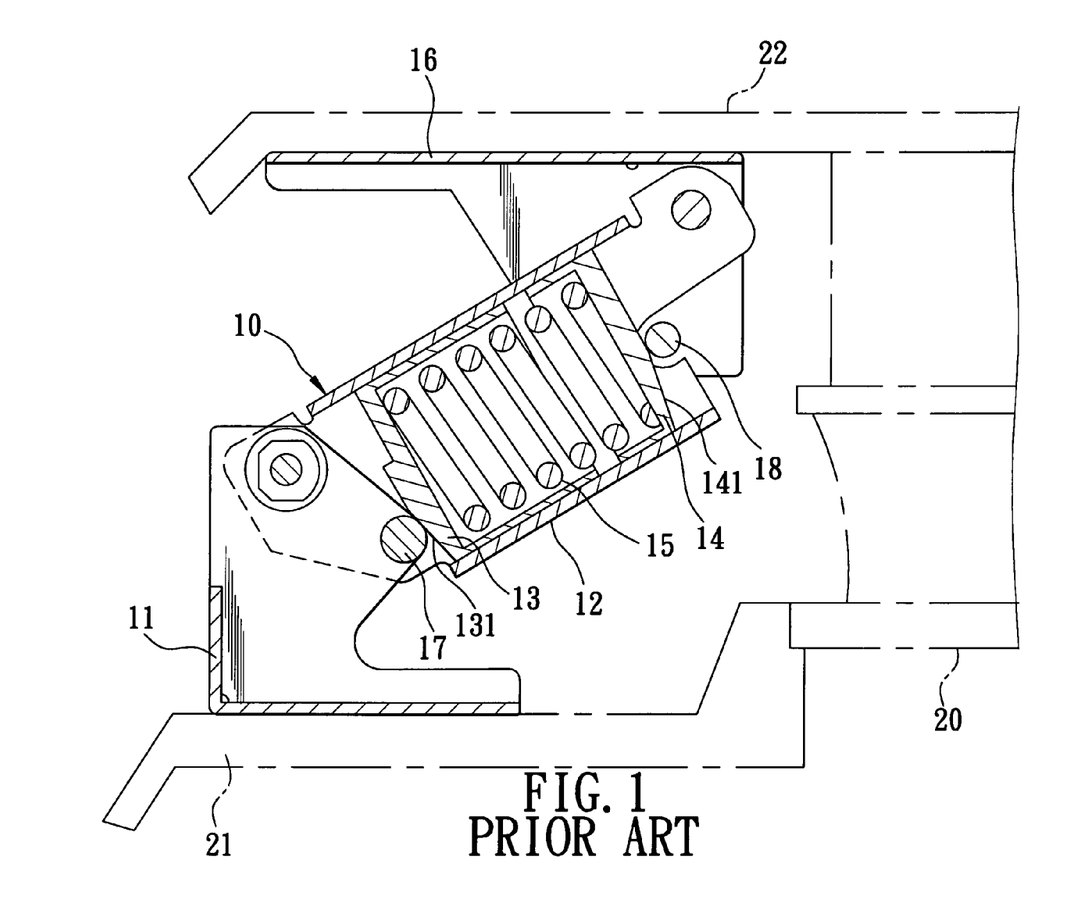
FIG. 1 is a sectional side view of a conventional knuckle arm disclosed in U.S. Pat. No. 6,456,365.

Two knuckle arms are typically disposed between a top cover and a machine body of an office machine, such as a copier, or scanner, for use in the opening and closing of the top cover relative to the machine body. Referring to FIG. 1, a conventional knuckle arm 10, which is disclosed in U.S. Pat. No. 6,456,365, is shown to include a mounting seat 11 fixed on a machine body 21 of an office machine 20, a connecting seat 12 disposed pivotally on the mounting seat 11, a bottom cam sliding seat 13 disposed slidably within the connecting seat 12, a top cam sliding seat 14 disposed slidably within the connecting seat 12 and located above the bottom cam sliding seat 13, a compression spring 15 disposed between the bottom and top cam sliding seats 13, 14, a lifting seat 16 disposed pivotally on the connecting seat 12 and connected fixedly to a top cover 22 of the office machine 20, a bottom pivot rod 17 extending through the mounting seat 11 and the connecting seat 12 and kept in contact with a cam surface 131 of the bottom cam sliding seat 13, and a top pivot rod 18 extending through the connecting seat 12 and kept in contact with a cam surface 141 of the top cam sliding seat 14.

As such, a force can be applied to the top cover 22 so as to open and close the top cover 22 relative to the machine body 21. Although the knuckle arm 10 can achieve its intended purposes, in actual use, it suffers from the following disadvantages:

(1) Since the total weight of the lifting seat 16, the connecting seat 12, the top cam sliding seat 14, the spring 15 and the bottom cam sliding seat 13 is significant, the user must exert a large force to open and close the top cover 22. This particularly burdensome when the top cover is opened or closed with one hand.

(2) Lubrication oil is applied between the connecting seat 12 and each of the top and bottom cam sliding seats 14, 13 so as to enable smooth movement of the top and bottom cam sliding seats 14, 13 within the connecting seat 12. However, because the connecting seat 12 as well as the top and the bottom cam sliding seats 14, 13 are disposed outwardly of the mounting seat 11, the lubrication oil may stain the paper, documents, etc. used in the office machine 20.

(3) There is a need for high precision during manufacture of the cam surfaces 131, 141 of the bottom and top cam sliding seats 13, 14. The processes required to achieve such high precision ultimately result in high manufacturing costs of the knuckle arm 10.

SUMMARY OF THE INVENTION

An object of this invention is to provide a knuckle arm that can be operated by application of a minimal force.

Another object of this invention is to provide a knuckle arm that is used in the opening and closing of a top cover of an office machine, and that does not directly or indirectly soil the paper, documents, etc. used in the office machine.

A further object of this invention is to provide a knuckle arm that includes only one cam surface requiring high manufacturing precision.

Accordingly, a knuckle arm of this invention interconnects a machine body and a top cover of a machine. In one preferred embodiment, the knuckle arm includes a base fixed on the machine body, an inner sliding seat disposed slidably within the base, a resilient member disposed between the base and the inner sliding seat, a first pivotable seat sleeved on the base, a pressing rod extending through the first pivotable seat and kept in contact with the inner sliding seat, a second pivotable seat disposed slidably outside the first pivotable seat, a third pivotable seat disposed pivotally on the second pivotable seat, a first pivot rod, a second pivot rod and a third pivot rod.

The base includes a mounting plate unit fixed on the machine body, two pivot plates connected fixedly to the mounting plate unit, two first pivot holes formed respectively through the pivot plates, and a receiving frame. The receiving frame includes a pair of spaced-apart top and bottom walls that are secured between the pivot plates and that are inclined relative to the mounting plate unit, and an abutment wall interconnecting the top and bottom walls to define an accommodating chamber among the top wall, the bottom wall, the abutment wall and the pivot plates.

The inner sliding seat is disposed slidably within the accommodating chamber along a path inclined relative to the mounting plate unit, and has a cam surface and an abutment surface that are opposite to each other.

The resilient member is disposed within the accommodating chamber between the abutment wall of the base and the abutment surface of the inner sliding seat.

The first pivotable seat includes two first wing plates located respectively to two opposite sides of an assembly of the pivot plates, a first connecting plate interconnecting the first wing plates fixedly, two through holes formed respectively through the first wing plates, two slots formed respectively through the first wing plates, two apertures formed respectively through the first wing plates, and two engagement blocks extending respectively and integrally from the first wing plates toward each other.

The pressing rod extends through the through holes in the first pivotable seat, and is kept in contact with the cam surface of the inner sliding seat.

The second pivotable seat includes two second wing plates located respectively to two opposite sides of an assembly of the first wing plates of the first pivotable seat, a second connecting plate interconnecting the second wing plates fixedly, two limiting plates connected respectively and fixedly to and perpendicular to the second wing plates to define a limiting chamber among the second wing plates, the second connecting plates and the limiting plates, two second pivot holes formed respectively through the second wing plates, two curved slots formed respectively through the second wing plates, and two third pivot holes formed respectively through the second wing plates.

The first pivot rod extends through the second pivot holes in the second pivotable seat and the first pivot holes in the base.

The third pivotable seat includes two third wing plates located respectively to two opposite sides of an assembly of the second wing plates of the second pivotable seat, a coupling plate interconnecting the third wing plates fixedly and connected fixedly to the top cover of the machine, two fourth pivot holes formed respectively through the third wing plates, and two fifth pivot holes formed respectively through the third wing plates.

The second pivot rod extends through the fifth pivot holes in the third pivotable seat and the curved slots in the second pivotable seat, and presses against the engagement blocks of the first pivotable seat.

The third pivot rod extends through the fourth pivot holes in the third pivotable seat, the third pivot holes in the second pivotable seat, and the slots in the first pivotable seat.

Because the inner sliding seat and the resilient member are disposed within the base, when the top cover is opened or closed by one hand, the user does not have to support the weight of the inner sliding seat or the resilient member. Thus, the top cover can be operated in a manner requiring the user to exert a minimal force. Furthermore, because the inner sliding seat is disposed within the base, lubrication oil is applied within the base. Thus, the staining of paper, documents, etc, by the lubrication oil can be prevented during use of the office machine.

In addition, the knuckle arm has only one cam surface, and therefore can be easily manufactured.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 2:
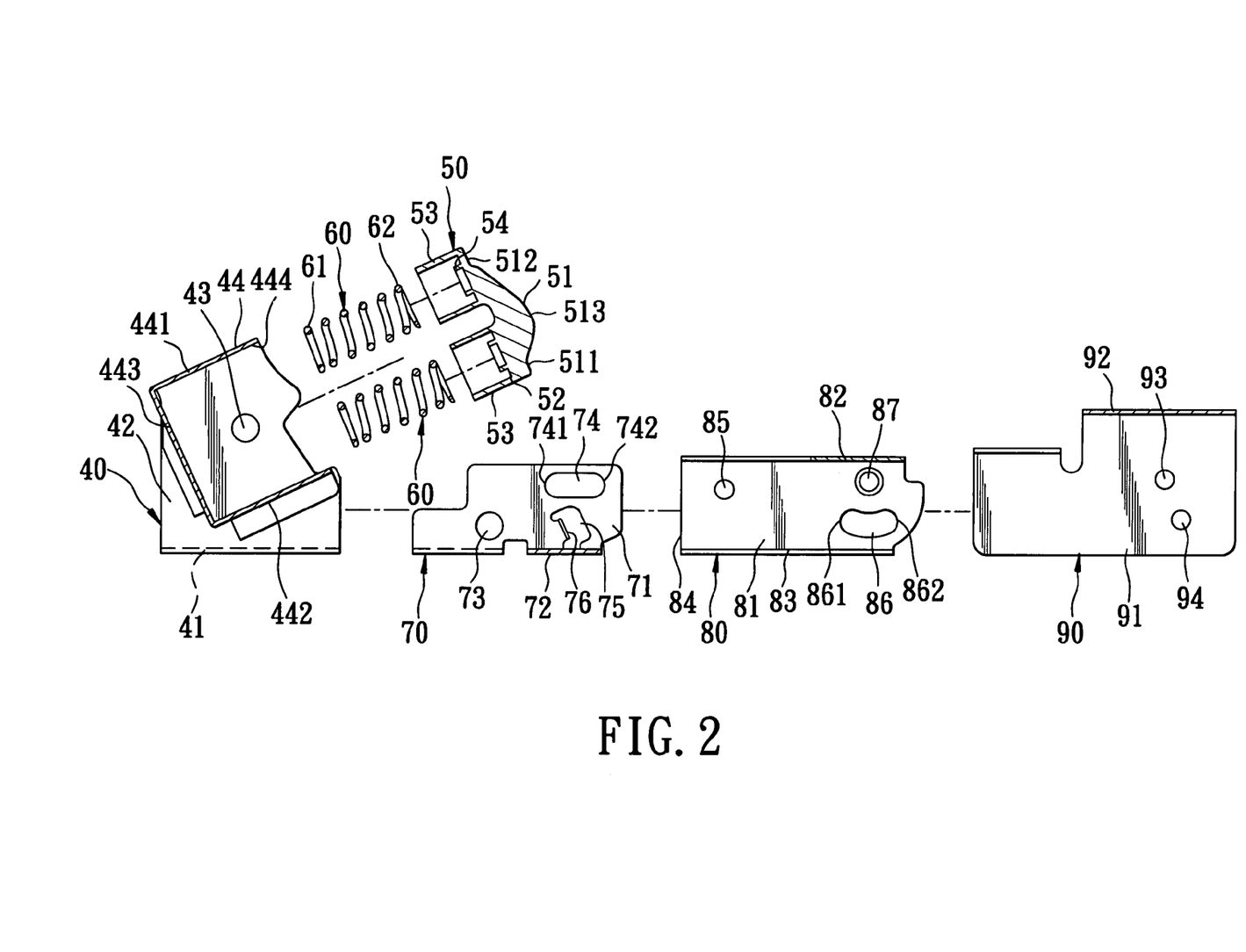
FIG. 2 is an exploded sectional view of the preferred embodiment of a knuckle arm according to this invention.
Figure 8:
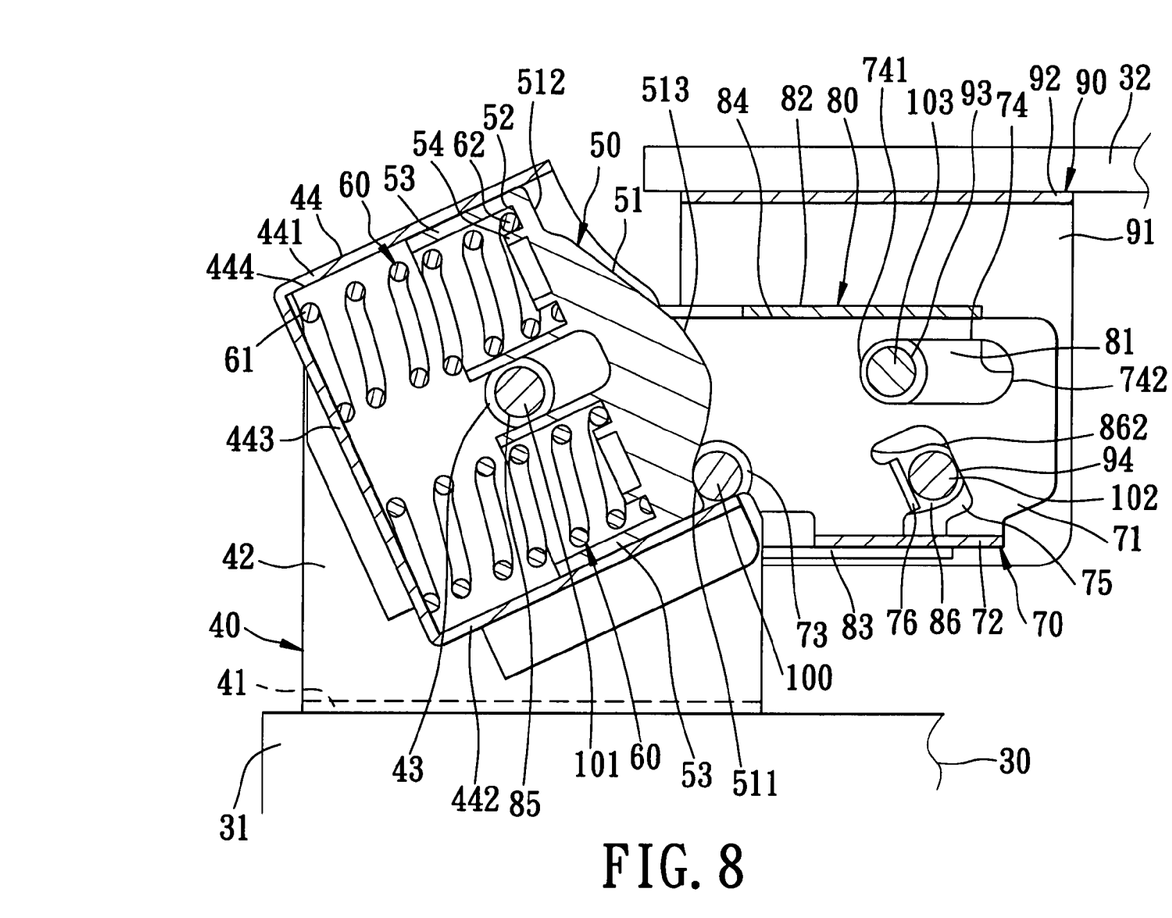
FIG. 8 is a sectional side view of the preferred embodiment, illustrating how a top cover of the copier is closed.

Referring to FIGS. 2 and 8, the preferred embodiment of a knuckle arm according to this invention interconnects a machine body 31 and a top cover 32 of an office machine 30, and is constructed so as to allow for the opening and closing of the top cover 32 relative to the machine body 31. The office machine may be a copier, scanner, etc.

The knuckle arm includes a base 40, an inner sliding seat 50 disposed slidably within the base 40, four resilient members 60 (only two are shown in FIGS. 2 and 8) disposed between the base 40 and the inner sliding seat 50, a first pivotable seat 70 disposed pivotally on the base 40, a pressing rod 100 extending through the first pivotable seat 70 and kept in contact with a cam surface 51 of the inner sliding seat 50, a second pivotable seat 80 sleeved on the first pivotable seat 70, a third pivotable seat 90 disposed pivotally on the second pivotable seat 80, a first pivot rod 101 extending through the second pivotable seat 80 and the base 40, a second pivot rod 102, and a third pivot rod 103. Each of the second and third pivot rods 102, 103 extends through the first, second and third pivotable seats 70, 80, 90.

Figure 3:
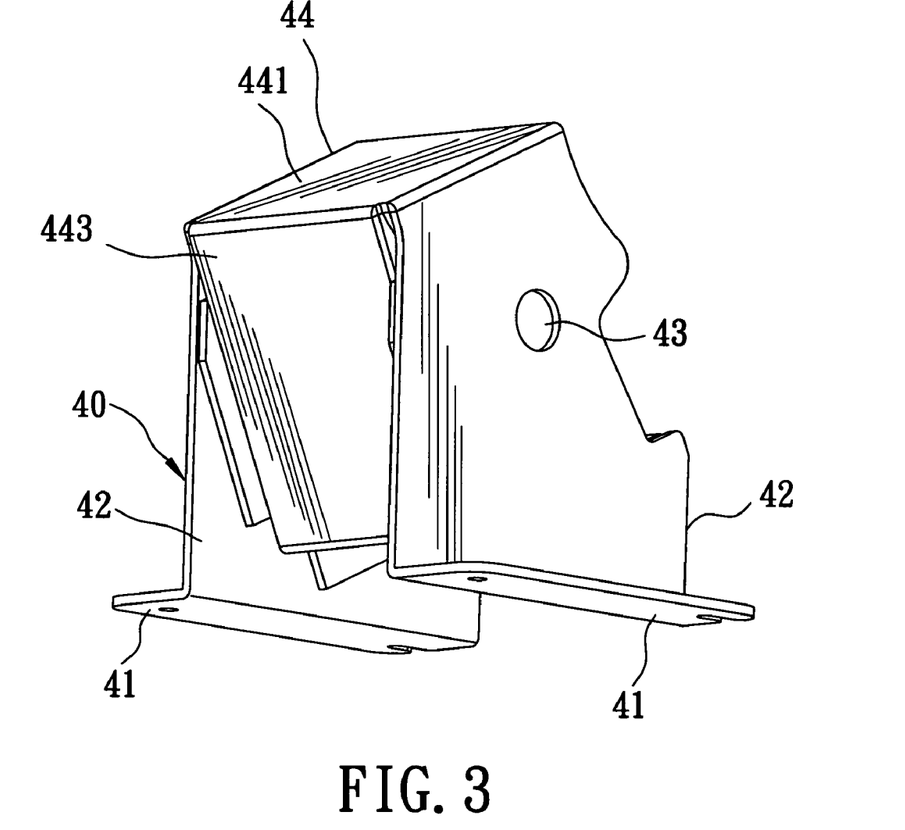
FIG. 3 is a perspective view of a base of the preferred embodiment.

Referring to FIGS. 2 and 3, the base 40 includes a mounting plate unit consisting of two coplanar mounting plates 41, two pivot plates 42 formed respectively and integrally with and perpendicular to the mounting plates 41, two first pivot holes 43 formed respectively through the pivot plates 42, and a receiving frame 44 secured between the pivot plates 42. The receiving frame 44 includes a top wall 441, a bottom wall 442 and an abutment wall 443. The top and bottom walls 441, 442 are secured between the pivot plates 42, are inclined relative to the mounting plates 41, and are spaced apart from each other. The abutment wall 443 has two opposite sides formed respectively and integrally with the top and bottom walls 441, 442. An accommodating chamber 444 is therefore defined among the top wall 441, the bottom wall 442, the abutment wall 443 and the pivot plates 42.

Figure 4:
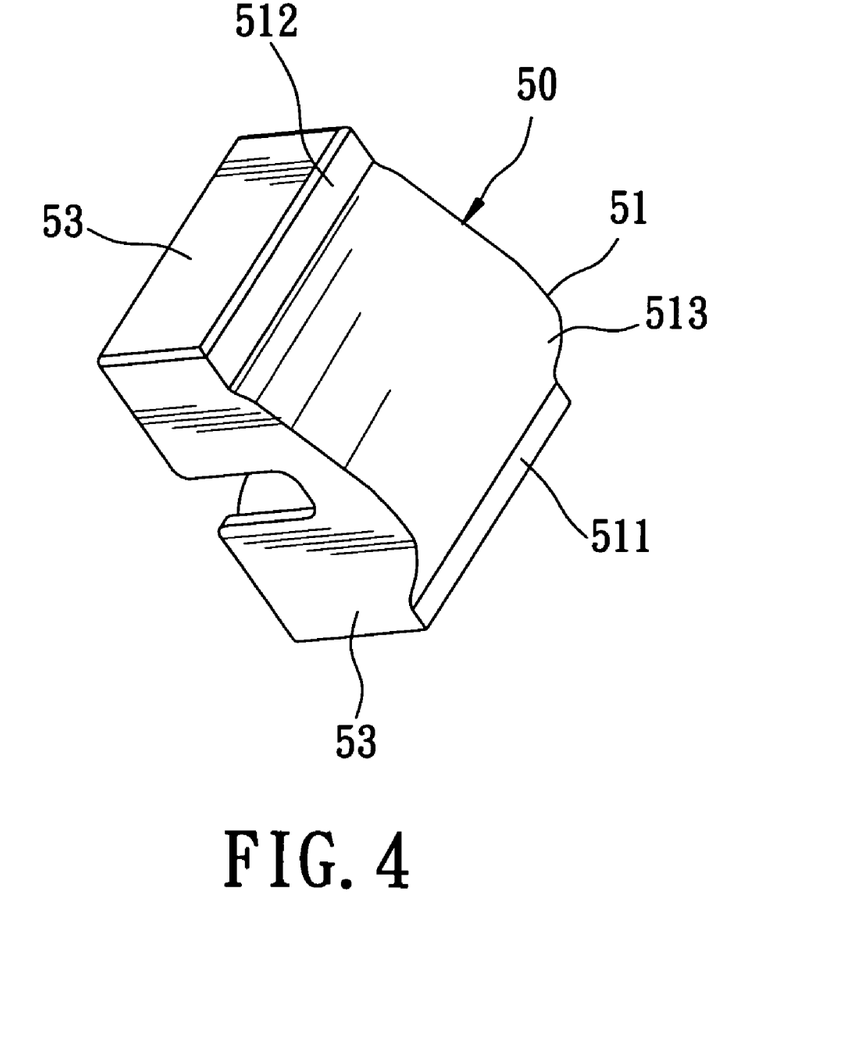
FIG. 4 is a perspective view of an inner sliding seat of the preferred embodiment.

Referring to FIGS. 2 and 4, the inner sliding seat 50 can slide within the accommodating chamber 444 along a path inclined relative to the mounting plates 41. The inner sliding seat 50 has a cam surface 51, and an abutment surface 52 that is opposite to the cam surface 51 and that faces the abutment wall 443 of the base 40. The inner sliding seat 50 further includes four engagement walls 53 (only two is shown in FIG. 4) and four annular flanges 54. Each of the engagement walls 53 and the annular flanges 54 extends from the abutment surface 52 toward the abutment wall 443 of the base 40. The engagement walls 53 abut respectively against the top wall 441, the bottom wall 442 and the pivot plates 42. Therefore, the inner sliding seat 50 is guided to move within the accommodating chamber 444 along a direction. The cam surface 51 has opposite first and second ends 511, 512, and a convex middle portion 513 disposed between the first and second ends 511, 512.

Each of the resilient members 60 is configured as a coiled compression spring, is disposed within the accommodating chamber 444, and has a first end foot 61 pressing against the abutment wall 443 of the base 40, and a second end foot 62 sleeved on the corresponding annular flange 54 in a close-fitting manner and pressing against the abutment surface 52 of the inner sliding seat 50. As such, the inner sliding seat 50 is biased by the springs 60 to move away from the abutment wall 443 of the base 40.

Figure 5:
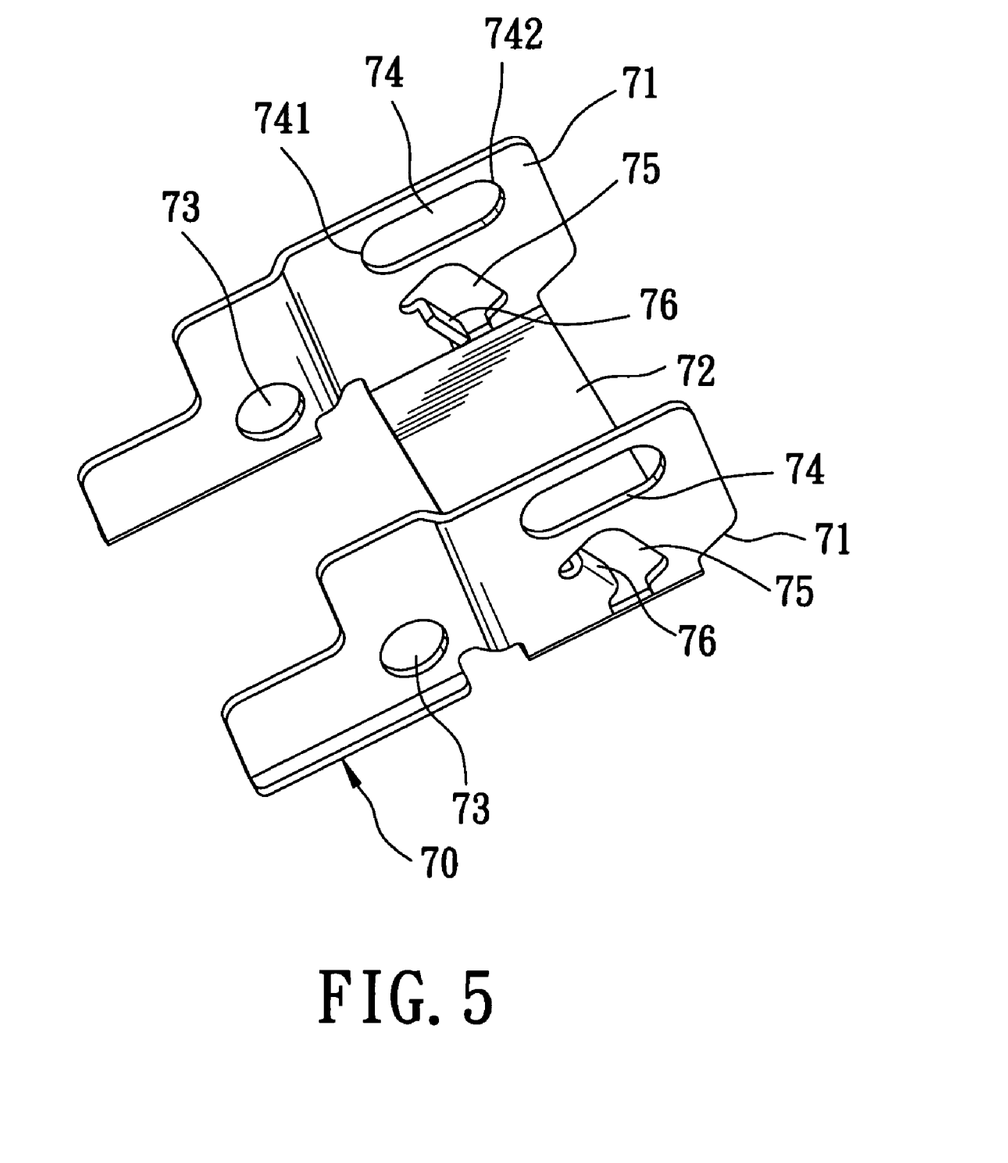
FIG. 5 is a perspective view of a first pivotable seat of the preferred embodiment.

Referring to FIGS. 2 and 5, the first pivotable seat 70 includes two first wing plates 71 located respectively to two opposite sides of an assembly of the pivot plates 42 of the base 40, a first connecting plate 72 interconnecting the first wing plates 71 fixedly, two through holes 73 formed respectively through the first wing plates 71, two slots 74 formed respectively through the first wing plates 71, two apertures 75 formed respectively through the first wing plates 71, and two aligned engagement blocks 76 extending respectively and integrally from the first wing plates 71 toward each other. Each of the slots 74 has a first end 741 proximate to the base 40, and a second end 742 opposite to the first end 741 and distal from the base 40.

Referring to FIG. 8, the pressing rod 100 extends through the through holes 73 in the first pivotable seat 70, and is kept in contact with the cam surface 51 of the inner sliding seat 50 due to the biasing action of the resilient members 60.

Figure 6:
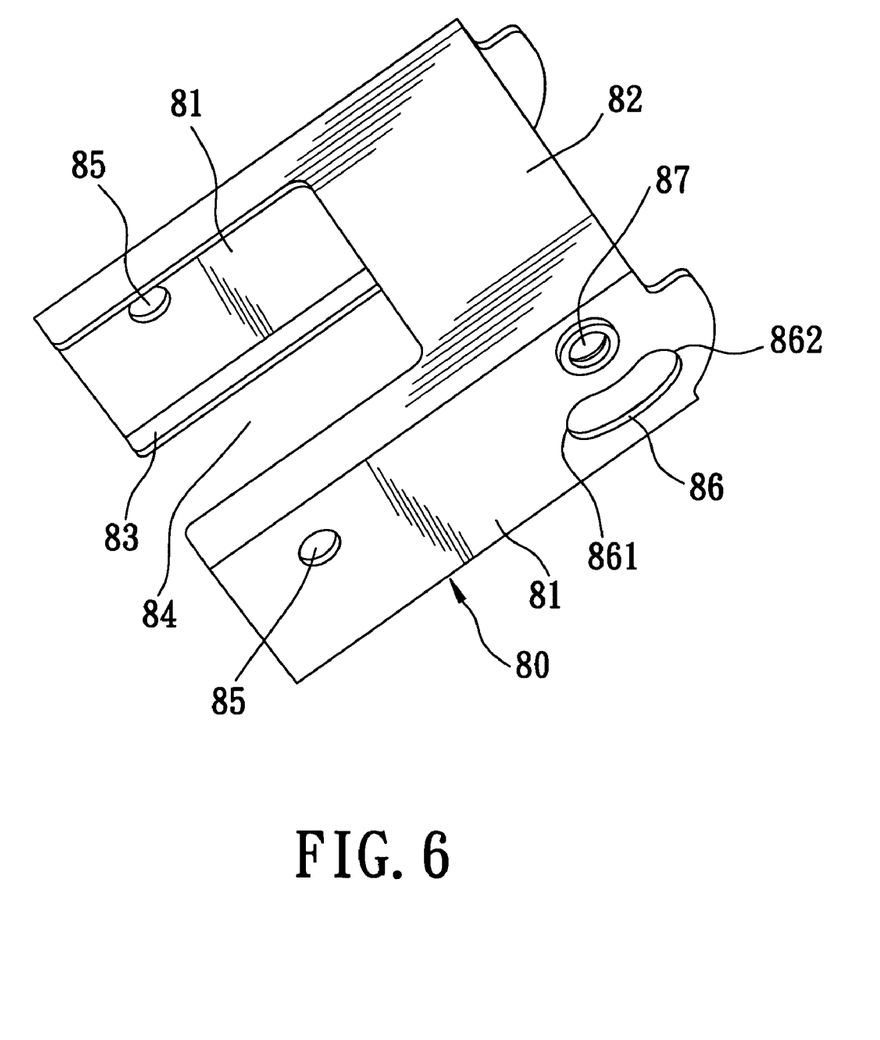
FIG. 6 is a perspective view of a second pivotable seat of the preferred embodiment.

Referring to FIGS. 2 an 6, the second pivotable seat 80 includes two second wing plates 81 located respectively to two opposite sides of an assembly of the first wing plates 71 of the first pivotable seat 70, a second connecting plate 82 interconnecting the second wing plates 81 fixedly, two limiting plates 83 formed respectively and integrally with and perpendicular to the second wing plates 81, two second pivot holes 85 formed respectively through the second wing plates 81, two curved slots 86 formed respectively through the second wing plates 81, and two third pivot holes 87 formed respectively through the second wing plates 81. A limiting chamber 84 is defined among the second wing plates 81, the second connecting plate 82 and the limiting plates 83. The first pivotable seat 70 is limited to move within the limiting chamber 84. Each of the curved slots 86 has a first end 861 proximate to the base 40, and a second end 862 opposite to the first end 861 and distal from the base 40.

Referring to FIG. 8, the first pivot rod 101 extends through the second pivot holes 85 in the second pivotable seat 80 and the first pivot holes 43 in the base 40.

Figure 7:
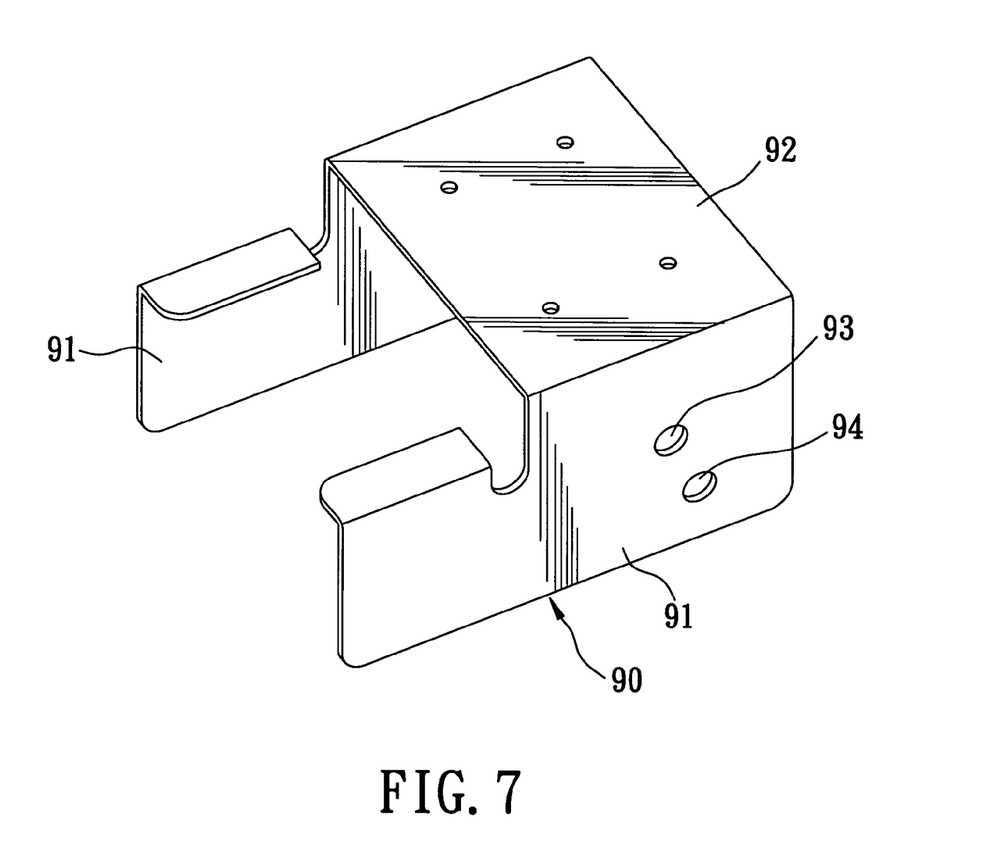
FIG. 7 is a perspective view of a third pivotable seat of the preferred embodiment.

Referring to FIGS. 2 and 7, the third pivotable seat 90 includes two third wing plates 91 located respectively to two opposite sides of an assembly of the second wing plates 81 of the second pivotable seat 80, a mounting plate 92 interconnecting the third wing plates 91 and connected fixedly to the top cover 32 (see FIG. 8), two fourth pivot holes 93 formed respectively through the third wing plates 91, and two fifth pivot holes 94 formed respectively through the third wing plates 91.

The second pivot rod 102 extends through the fifth pivot holes 94 in the third pivotable seat 90, the curved slots 86 in the second pivotable seat 80 and the apertures 75 in the first pivotable seat 70. The second pivot rod 102 presses against the engagement blocks 76 of the first pivotable seat 70.

The third pivot rod 103 extends through the fourth pivot holes 93 in the third pivotable seat 90, the third pivot holes 87 in the second pivotable seat 80 and the slots 74 in the first pivotable seat 70.

Figure 12:
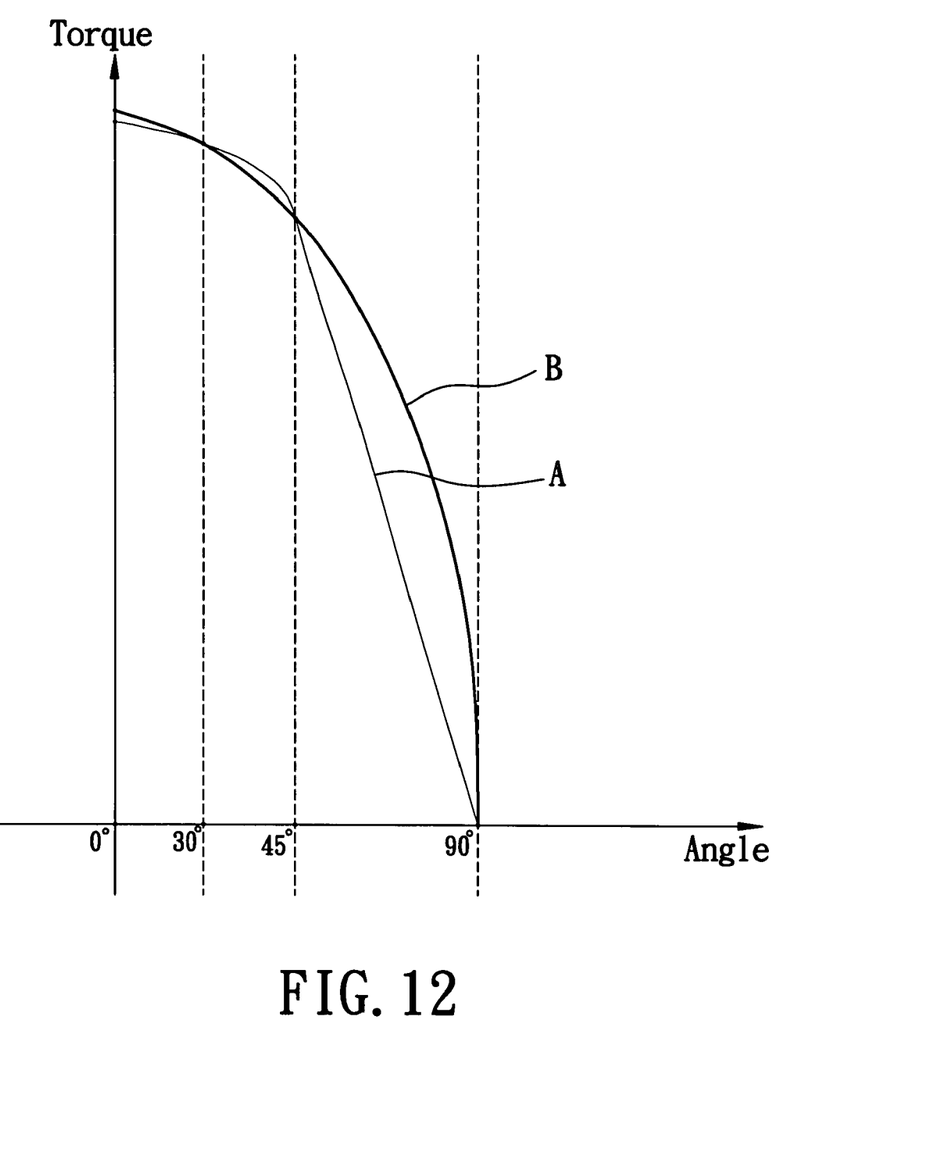
FIG. 12 is a graph showing the distribution of a spring torque and a gravitational torque as a function of an opening angle of the top cover.

Referring to FIGS. 8 and 12, a spring force applied to the inner sliding seat 50 by the resilient members 60 is transmitted to the pressing rod 100, the first pivotable seat 70, the engagement blocks 76, the second pivot rod 102, the third pivotable seat 90 and the top cover 32. As such, the resilient members 60 produce a counterclockwise spring torque (A) on the first pivot rod 101, and the top cover 32 produces a clockwise gravitational torque (B) on the first pivot rod 101. Each of the spring torque (A) and the gravitational torque (B) changes according to the position of the inner sliding seat 50 within the accommodating chamber 444 in the receiving frame 44. FIG. 12 shows changes in the spring torque (A) and the gravitational torque (B) as a function of the opening angle of the top cover 32.

When the top cover 32 is closed (i.e. when the opening angle of the top cover 32 is zero), the gravitational torque (B) is greater than the spring torque (A). Thus, the top cover 32 is maintained at the closed position. At this time, the pressing rod 100 is in contact with the first end 511 of the cam surface 51.

Figure 9:
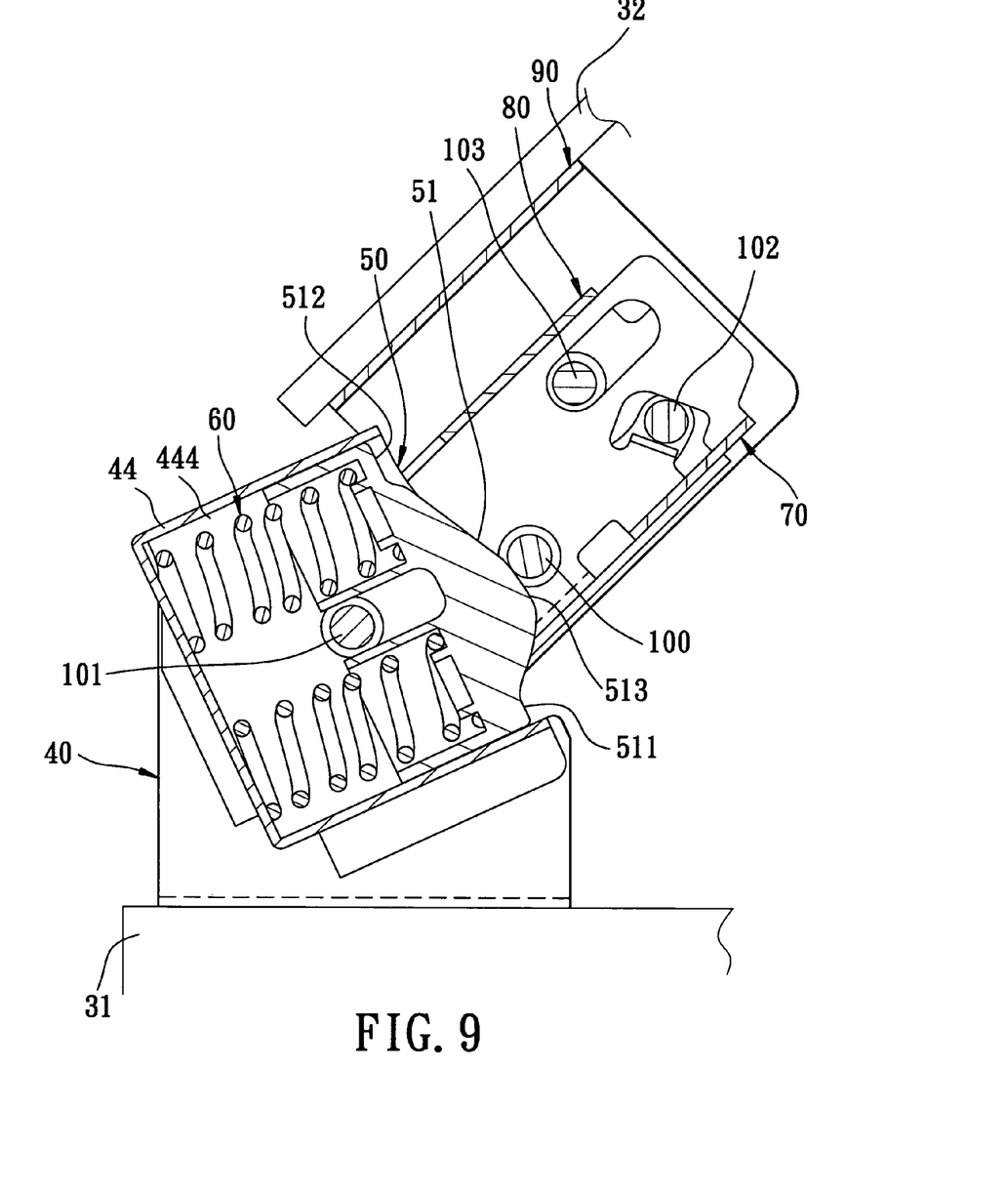
FIG. 9 is a sectional side view of the preferred embodiment, illustrating how the top cover of the copier is opened to an angle ranging between 30 and 90 degrees.

Referring to FIGS. 2, 9, and 12, when the top cover 32 is pivoted upwardly from the closed position, the positions of the third pivotable seat 90, the second pivot rod 102, the third pivot rod 103, the second pivotable seat 80, the first pivotable seat 70, and the pressing rod 100 relative to the base 40 are changed. The opening of the top cover 32 results in movement of the pressing rod 100 from the first end 511 of the cam surface 51 toward the second end 512 of the cam surface 51. When the top cover 32 is opened to an angle of 30 degrees, the gravitational torque (B) is equal to the spring torque (A), as shown in FIG. 12. As a consequence, when released, the top cover 32 is maintained at the 30° open position. At this time, the pressing rod 100 is in contact with the convex middle portion 513 of the cam surface 51.

The curves of the spring torque (A) and the gravitational torque (B) in FIG. 12 also intersect at two other positions, at which the opening angles of the top cover 32 are 45 and 90 degrees, respectively. Hence, the top cover 32 is self-positioning.

Figure 10:
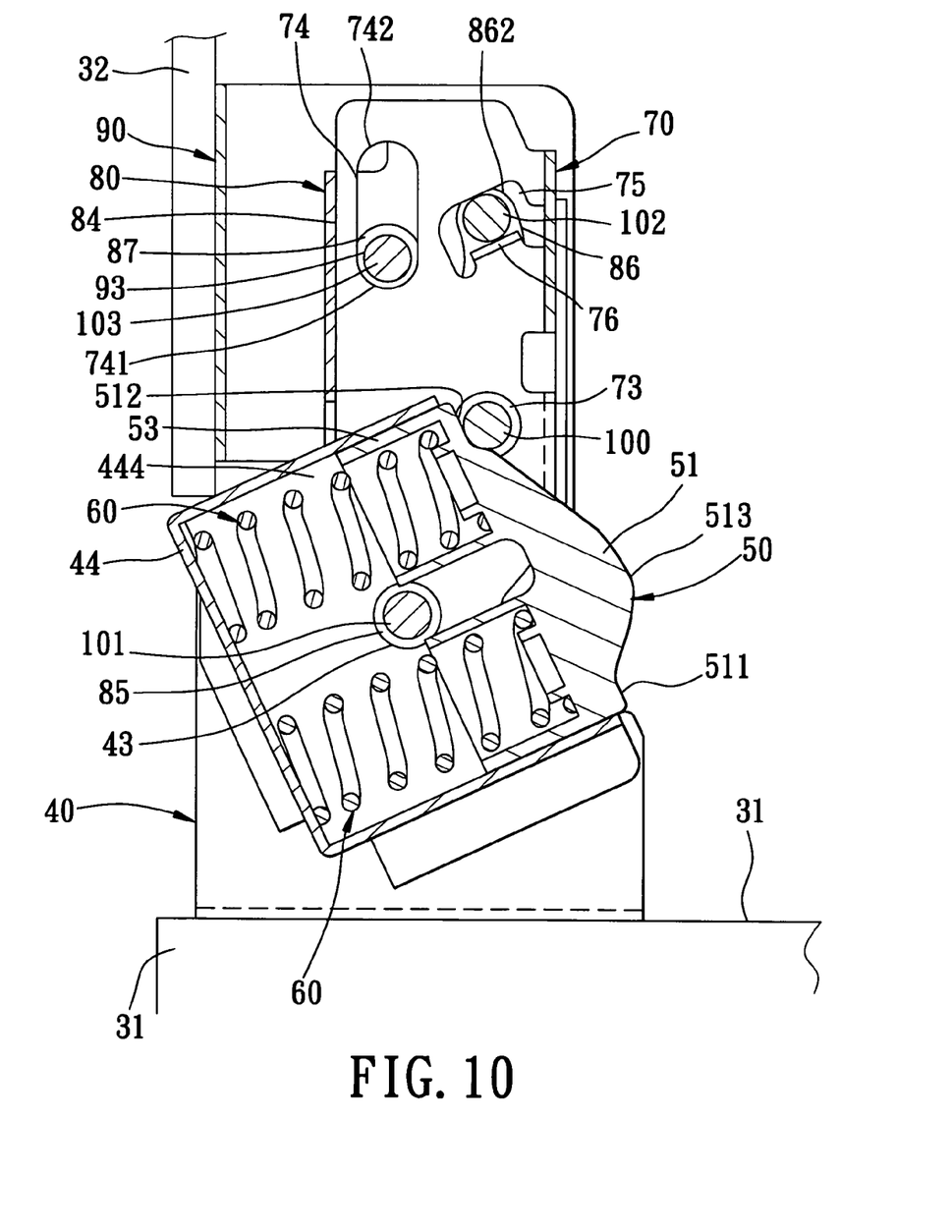
FIG. 10 is a sectional side view of the preferred embodiment, illustrating how the top cover of the copier is opened to an angle of about 90 degrees.

The top cover 32 can be easily moved from the 30° open position to a 90° open position shown in FIG. 10 in view of the fact that the pressing rod 100 easily slides from the convex middle portion 513 of the cam surface 51 to the second end 512 of the cam surface 51 during this period.

During movement of the top cover 32 from the closed position to the 90° open position, the third pivot rod 103 is kept at the first ends 741 of the slots 74, and the second pivot rod 102 is kept at the second ends 862 of the curved slots 86.

Figure 11:
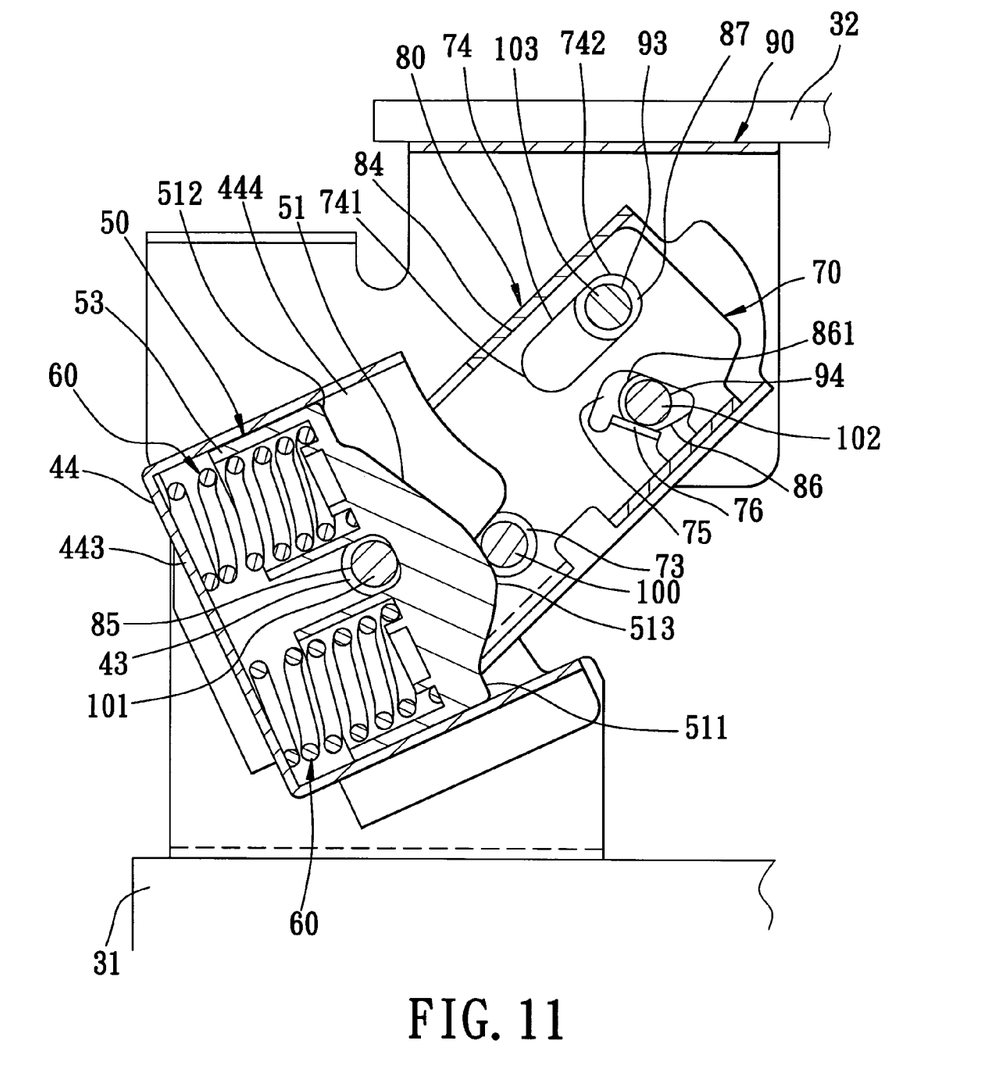
FIG. 11 is a sectional side view of the preferred embodiment, illustrating the position of the top cover of the copier when manipulation of a thick document is required.

When a thick document (not shown) is used in the office machine 30 (see FIG. 8), the top cover 32 is turned downwardly from the 90° open position toward the closed position. At the same time, the pressing rod 100 moves from the second end 512 of the cam surface 51 toward the convex middle portion 513 of the cam surface 51. As a result, the second pivot rod 102 moves from the second ends 862 of the curved slots 86 to the first ends 861 of the curved slots 86, as shown in FIG. 11. Hence, the first pivotable seat 70 moves within the limiting chamber 84 in the second pivotable seat 80 in a direction toward the inner sliding seat 50 so as to move the inner sliding seat 50 toward the abutment wall 443 of the base 40. At the same time, the third pivot rod 103 moves from the first ends 741 of the slots 74 to the second ends 742 of the slots 74. When the top cover 32 rests on the thick document (not shown), the gravitational torque (B) is greater than the spring torque (A), thereby maintaining the positioning of the top cover 32 on the thick document.

Alternatively, the top cover 32 may be mounted directly to the second pivotable seat 80. In this case, the third pivot rod 103, the third pivotable seat 90, the third pivot holes 87 in the second pivotable seat 80, and the slots 74 in the first pivotable seat 70 are omitted. This still allows for the self-positioning of the top cover 32.

The knuckle arm of this invention has the following advantages:

(1) When the top cover 32 is opened or closed by one hand, only the combined weight of the top cover 32, the third pivotable seat 90, the second pivotable seat 90, the second pivotable seat 80, the first pivotable seat 70, the second pivot rod 102, the third pivot rod 103 and the pressing rod 100 need be supported by the user. Because the user does not have to support the weight of the inner sliding seat 50 or the resilient members 60, the top cover 32 can be opened or closed in a manner requiring the user to exert only a minimal force.

(2) Because the inner sliding seat 50 is concealed within the receiving frame 44 of the base 40, lubrication oil applied to the inner sliding seat 50 is contained within the base 40, thereby preventing the staining of paper, documents, etc. by the lubrication oil.

(3) There is a need for high precision during manufacture of a cam surface. Since the knuckle arm of this invention includes only one cam surface 51, there is realized a reduction in the manufacturing costs of the knuckle arm of this invention in comparison with the conventional knuckle arm 10 (see FIG. 1).

Therefore, the objects of this invention can be achieved.

With this invention thus explained, it is apparent that numerous modifications and variations can be made without departing from the scope and spirit of this invention. It is therefore intended that this invention be limited only as indicated by the appended claims.

We claim:

1. A knuckle arm adapted to be connected to a machine body and a top cover of a machine, said knuckle arm comprising:

a base including a mounting plate unit adapted to be disposed fixedly on the machine body, two pivot plates connected fixedly to said mounting plate unit, two first pivot holes formed respectively through said pivot plates, and a receiving frame secured between said pivot plates, said receiving frame including a top wall, a bottom wall that is spaced apart from said top wall, and an abutment wall interconnecting said top and bottom walls fixedly to define an accommodating chamber among said top wall, said bottom wall, said abutment wall and said pivot plates;

an inner sliding seat disposed movably within said accommodating chamber in said base and having a cam surface;

at least one resilient member disposed within said accommodating chamber in said base and biasing said inner sliding seat to move away from said abutment wall;

a first pivotable seat including two first wing plates located respectively to two opposite sides of an assembly of said pivot plates, a first connecting plate interconnecting said first wing plates fixedly, two through holes formed respectively through said first wing plates, and two apertures formed respectively through said first wing plates;

a pressing rod extending through said through holes in said first pivotable seat and biased by said resilient member to contact said cam surface of said inner sliding seat;

a second pivotable seat including two second wing plates located respectively to two opposite sides of an assembly of said first wing plates of said first pivotable seat, a second connecting plate interconnecting said second wing plates fixedly and adapted to be attached to the top cover of the machine, two limiting plates connected respectively and fixedly to and perpendicular to the second wing plates to define a limiting chamber among said second wing plates, said second connecting plate and said limiting plates, two second pivot holes formed respectively through said second wing plates, and two curved slots formed respectively through said second wing plates;

a first pivot rod extending through said second pivot holes in said second pivotable seat and said first pivot holes in said base; and a second pivot rod extending through said curved slots in said second pivotable seat and said apertures in said first pivotable seat.

2. The knuckle arm as claimed in claim 1, wherein said first pivotable seat further includes two engagement blocks extending respectively and integrally from said first wing plates toward each other and situated such that said second pivot rod presses against said engagement blocks.

3. The knuckle arm as claimed in claim 2, wherein said top and bottom walls of said base are inclined relative to said mounting plate unit, said inner sliding seat being movable within said accommodating chamber in said base in a direction inclined relative to said mounting plate unit.

4. The knuckle arm as claimed in claim 3, further comprising a third pivotable seat and a third pivot rod, said second pivotable seat further including two third pivot holes formed respectively through said second wing plates, said third pivotable seat including two third wing plates located respectively to two opposite sides of an assembly of said second wing plates of said second pivotable seat, a coupling plate interconnecting said third wing plates fixedly and adapted to be connected fixedly to the top cover of the machine, two fourth pivot holes formed respectively through said third wing plates, and two fifth pivot holes formed respectively through said third wing plates, said first pivotable seat further including two slots formed respectively through said first wing plates, said third pivot rod extending through said fourth pivot holes in said third pivotable seat, said third pivot holes in said second pivotable seat, and said slots in said first pivotable seat, said second pivot rod extending through said fifth pivot holes in said third pivotable seat, said curved slots in said second pivotable seat, and said apertures in said first pivotable seat.

5. The knuckle arm as claimed in claim 4, wherein said resilient member is configured as a coiled compression spring that has a first end foot pressing against said abutment wall of said receiving frame of said base, and a second end foot pressing against said inner sliding seat.

6. The knuckle arm as claimed in claim 5, wherein said cam surface of said inner sliding seat has opposite first and second ends, and a convex middle portion disposed between said first and second ends.

7. The knuckle arm as claimed in claim 6, wherein said inner sliding seat further has an abutment surface opposite to said cam surface, and four engagement walls extending from said abutment surface toward said abutment wall of said receiving frame, said engagement walls abutting respectively against said pivot plates, and said top and bottom walls of said base.

8. The knuckle arm as claimed in claim 7, wherein said inner sliding seat further has an annular flange that extends from said abutment surface toward said abutment wall of said base, said second end foot of said resilient member being sleeved on said annular flange in a close fitting manner.

* * * * *